US004001655B2

United States Statutory Invention Registration [19]

[11] Reg. Number: H1655

Task

[45] Published: Jun. 3, 1997

[54] BACKSCATTER HAZE MEASUREMENT USING A DISTRIBUTED LIGHT SOURCE

[75] Inventor: Harry L. Task, Dayton, Ohio

[73] Assignee: The United States of America as represented by the Secretary of the Air Force, Washington, D.C.

[21] Appl. No.: 416,600

[22] Filed: Apr. 4, 1995

[51] Int. Cl.[6] ..... G01N 21/47

[52] U.S. Cl. ..... 356/446

[58] Field of Search ..... 356/446

[56] References Cited

U.S. PATENT DOCUMENTS

| | | | |
|---|---|---|---|
| 3,327,583 | 6/1967 | Vanderschmidt et al. | 356/446 X |
| 3,771,877 | 11/1973 | Rosencranz | 356/446 |
| 4,029,420 | 6/1977 | Simms | 356/446 |
| 4,076,421 | 2/1978 | Kishner | 356/446 X |
| 4,623,258 | 11/1986 | Task et al. | 356/432 |
| 4,687,338 | 8/1987 | Task et al. | 356/446 |

*Primary Examiner*—Bernarr E. Gregory
*Attorney, Agent, or Firm*—Bobby D. Scearce; Thomas L. Kundert

[57] ABSTRACT

System and method for in situ measurement of haze in a transparency, such as an aircraft windscreen, canopies, windows or the like are described which comprise an annular light source for illuminating a selected test area of the transparency along a selected optical axis, a photodetector, and a lens for projecting an image of the illuminated test area along the axis onto the photodetector.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

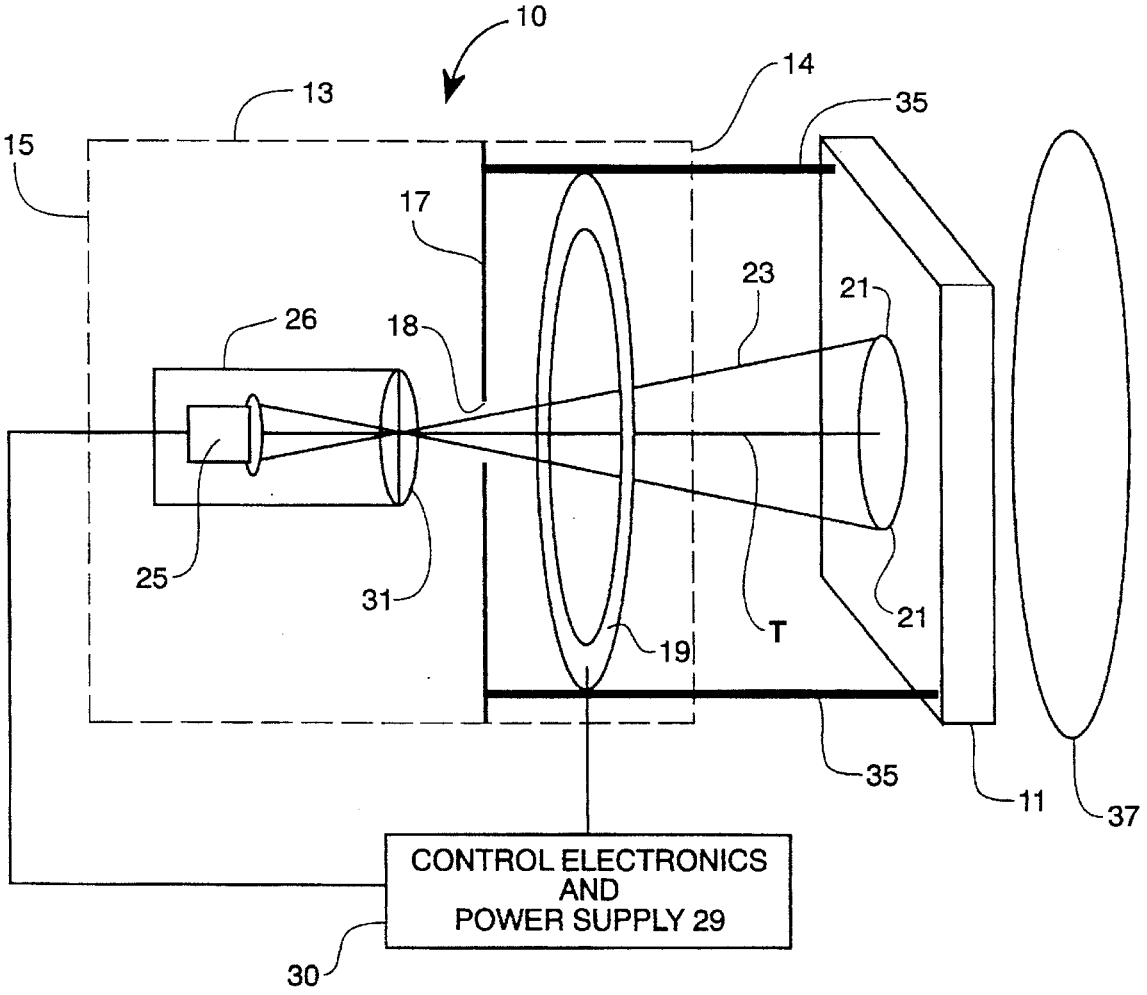
10
13
14
35
15
17
23
21
26
18
25
31
T
21
19
35
11
37
CONTROL ELECTRONICS
AND
POWER SUPPLY 29
30

BACKSCATTER HAZE MEASUREMENT USING A DISTRIBUTED LIGHT SOURCE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems for measuring haze in transparencies, such as aircraft windscreens, canopies, windows or the like, and more particularly to system and method for in situ measurement of haze in a transparency utilizing an annular light source.

A transparent material, especially plastic, has a tendency to scatter part of the light that is incident upon it. The effect of this scattered light is a veiling luminance (brightness) or haze that is visible in the transparency, and causes loss of contrast of objects viewed through the transparency. The American Society for Testing and Materials (ASTM) has a standard test method (D-1003) based on a National Institute of Standards and Technology circular to measure haze in transparent parts. This procedure requires collimated light to be projected through the part to an aperture in an integrating sphere. The collimated light source and integrating sphere must be disposed on opposite sides of the part and must be structurally interconnected in order to allow alignment between source and sphere, which limits the size and configuration of parts that can be tested using this method. A reliable haze test method is therefore required which provides haze values similar to the ASTM procedure but which does not require equipment components on both sides of the part to be tested (such as in situ tests of aircraft windscreens). A method described in U.S. Pat. No. 4,687,338 to Task et al requires equipment on one side only of the transparency but does not include effective means for reducing or determining directionality effects of light scatter in the transparency.

The invention solves or substantially reduces in critical importance problems with prior art testing methods as just described by providing system and method for accurate in situ measurement of haze in transparent parts, such as aircraft windscreens, wherein components of the system are required only on one side of the transparency being tested. The invention includes a distributed annular light source for illuminating the transparency and for reducing directionality effects on the haze measurement. A detector/lens combination measures luminance of the transparency along the axis of the annular light source.

The invention has substantial utility in monitoring aircraft transparencies for replacement at unsafe haze levels or in quality control associated with transparency manufacture.

It is therefore a principal object of the invention to provide system and method for measuring haze in a transparency.

It is another object of the invention to provide system and method for measuring haze in a transparency through illumination of the transparency and measurement of the haze therein from a single side of the transparency.

It is a further object of the invention to provide an inexpensive system and method for in situ measurement of haze in a transparency using an annular light source.

These and other objects of the invention will become apparent as a detailed description of representative embodiments proceeds.

SUMMARY OF THE INVENTION

In accordance with the foregoing principles and objects of the invention, system and method for in situ measurement of haze in a transparency, such as an aircraft windscreen, canopies, windows or the like are described which comprise an annular light source for illuminating a selected test area of the transparency along a selected optical axis, a photodetector, and a lens for projecting an image of the illuminated test area along the axis onto the photodetector.

DESCRIPTION OF THE DRAWINGS

The invention will be more clearly understood from the following detailed description of representative embodiments thereof read in conjunction with the accompanying drawing which is a schematic of the component pans of a representative system according to the invention and useful in practicing the method thereof.

DETAILED DESCRIPTION

Referring now to the drawing, shown therein are the component parts of a representative system 10 of the invention for measuring haze in transparency 11. Housing 13 having an open first end 14 and second substantially closed end 15 includes light baffle 17 having a central aperture 18. Annular light source 19 is disposed within housing 13 between baffle 17 and first end 14 and coaxial with aperture 18 along optical axis T. Light source 19 may be any suitable structure, such as an annularly distributed incandescent, fluorescent, electroluminescent or other light source type, the same not being limiting of the invention as defined by the appended claims. In a system built in demonstration of the invention, a circular fluorescent light source 19 was included. However, a plurality of individual lamps could be used if disposed in a circular pattern whereby a selected test area 21 of transparency 11 is substantially uniformly illuminated from substantially all directions defined around a cone-shaped region along axis T as suggested by region 23 defining test area 21. A circular diffuse light source 19 is utilized in order to provide illumination of test area 21 from many different directions to reduce effects of directionality that the material comprising transparency 11 may exhibit. Other annular configurations for light source 19 may be selected by one skilled in the art guided by these teachings, within the scope of the claims.

Photodetector 25 (such as a photodiode, phototransistor, selenium cell or photoresistor type), housed within light tight detector housing 26, is disposed within housing 13 between baffle 17 and second end 15 coaxially with light source 19 as suggested in the drawing. Power supply and electronic controls 29 are operatively connected to light source 19 and photodetector 25 and may be housed separately as in housing 30 or, alternatively, may be housed within housing 13 with photodetector 25 and light source 19. Further, light source 19 (or the individual lamps comprising source 19) may be modulated and the electronics 29 controlling the circuitry for photodetector 25 may be tuned to the same frequency of modulation to minimize the effects of ambient stray light on the haze measurements. The power supply may comprise any conventional AC or DC source or may be a battery source for portability of the system.

In accordance with a governing principle of the invention, luminance in the transparency generated by an illuminating source is approximately proportional to the haze in the transparency. Accordingly, lens 31 of appropriate focal length is disposed along axis T in a suitable position, such as that suggested in the drawing at one end of detector housing 26, for projecting an image of the scattered light from test area 21 of transparency 11 onto photodetector 25. Photodetector 25 is otherwise shielded by baffle 17 from light directly from source 19. Test area 21 must be maintained at a constant and predetermined distance from light source 19 and photodetector 25. Movable spacers 35 of any suitable structure which shields test area 21 from extraneous (ambient) light may therefore be slideably mounted within housing 13 at first end 14 thereof.

In order to make a haze measurement on transparency 11, system 10 is first calibrated using a sample of known haze value (such as measured using ASTM D-1003, Standard Test Method for Measuring Haze and Luminous Transmission of Transparent Pans) disposed at a selected location and spacer 35 position, such as suggested in the drawing for transparency 11. The gain control for photodetector 25 is then adjusted to a reading corresponding to the known haze value. System 10 is then placed over the sample transparency to be tested and the haze value is displayed directly by photodetector 25. System 10 has, in the unit built in demonstration of the invention, been shown to provide reliable and reproducible haze measurements for haze levels less than about 15%. For best results at very low level haze values, a section of light absorbing material, such as a piece of black cloth 37 may be placed near transparency 11 on the side opposite system 10 to ensure that there is no contribution to the measurement from light originating on the opposite side of transparency 11.

The invention therefore provides system and method for in situ measurement of haze in a transparency utilizing an annular light source. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A system for measuring haze in a transparency, comprising:

(a) a substantially light tight housing having an open end for placement against a transparency surface;

(b) a substantially circular light source disposed within said housing for projecting light along an optical axis onto said transparency and substantially uniformly illuminating a selected region of said transparency;

(c) an optical detector disposed within said housing substantially coaxially with said circular light source for measuring the luminance of said selected region of said transparency; and (d) light baffle means between said light source and said detector for blocking direct projection of light from said source to said detector.

2. The system of claim 1 .wherein said housing further includes means for selectively spacing said light source from said transparency.

3. The system of claim 1 wherein said optical detector comprises a photodiode, phototransistor, selenium cell or photoresistor.

* * * * *